United States Patent [19]
Kato

[11] Patent Number: 5,013,016
[45] Date of Patent: May 7, 1991

[54] POSITIONING TABLE

[75] Inventor: Heizaburo Kato, Shizuoka, Japan

[73] Assignee: Sankyo Manufacturing Company, Ltd., Tokyo, Japan

[21] Appl. No.: 539,211

[22] Filed: Jun. 18, 1990

[51] Int. Cl.⁵ .............................................. B67D 5/52
[52] U.S. Cl. ..................................................... 269/73
[58] Field of Search ................ 74/479, 25, 38, 49–50; 269/73; 108/137, 143; 33/1 M; 248/346, 637, 645, 178, DIG. 13; 250/442, 311

[56] References Cited

U.S. PATENT DOCUMENTS 4,503,721 3/1985 Hietanen et al. ...................... 74/25
4,821,595 4/1989 Podeschwa et al. ................. 269/73

FOREIGN PATENT DOCUMENTS 2067932 8/1981 United Kingdom ................... 269/73

Primary Examiner—Robert C. Watson
Attorney, Agent, or Firm—Pollock, Vande Sande & Priddy

[57] ABSTRACT

A positioning table includes a pair of direct drive motors mounted on a flat surface of a base. One of the direct drive motor drives a parallel crank mechanism so as to move a table in one direction. The other direct drive motor drives an arm member connected to the table through a rail, so as to move the table in the other direction perpendicular to the one direction. Thus, the table can be moved in a common plane into a desired position by driving the pair of direct drive motors.

3 Claims, 5 Drawing Sheets

FIG. I

POSITIONING TABLE

BACKGROUND OF THE INVENTION

1. Field of the Invention

This invention relates to a positioning table movable in a plane in the directions of the X-axis (the abscissa) and the Y-axis (the ordinate) of the coordinates disposed perpendicular to each other.

2. Description of the Prior Art

Positioning tables of the type under consideration have been widely used in assembling machines, machine tools, measuring apparatus, and like. A typical example of such positioning tables, as shown in FIG. 6, comprises an X-table 3 mounted on a bed 1 for sliding movement along a pair of roller guides 2, 2 provided respectively on opposite side portions of the bed 1. A Y-table 5 is mounted on the X-table 3 for sliding movement along a pair of roller guides 4, 4 in a direction perpendicular to the direction of movement of the X-table 3. A motor 6 is fixedly mounted on one end of the bed 1, and another motor 7 is fixedly mounted on one end of the X-table 3. The motor 6 is connected to the X-table 3 by a ball-screw rod (not shown), and the motor 7 is connected to the Y-table 5 by a ball-screw rod 8. Therefore, when the motor 6 is driven, the X-table 3 is moved relative to the bed 1, and when the motor 7 is driven, the Y-table 5 is moved relative to the X-table 3.

In the above conventional positioning table, since the driving forces are transmitted to the X- and Y-tables 3 and 5 through the ball-screw rods, positioning accuracies are not satisfactory because of backlashes. Further, the bed 1, the X-table 3 and the Y-table 5 are arranged in a three-layer manner, and the two motors 6 and 7 are projected from the sides of the positioning table. Therefore, the overall construction of the positioning table is rather bulky.

SUMMARY OF THE INVENTION

It is therefore an object of this invention to provide a positioning table which achieves high positioning accuracies and can make a machine or apparatus, incorporating the positioning table, smaller in size.

According to the present invention, there is provided a positioning table comprising:

(a) a base;

(b) first and second direct drive motors fixedly mounted on the base and having respective rotatable shafts directed upwardly;

(c) a first arm member fixedly mounted at its proximal end on the rotatable shaft of the first direct drive motor;

(d) a second arm member angularly movably mounted at its proximal end on the base;

(e) a first rail to which distal ends of the first and second arm members are pivotally connected, the first rail cooperating with the first and second arm members to form a parallel crank mechanism;

(f) first and second slide members mounted on the first rail for sliding movement therealong;

(g) a third arm member fixedly mounted at its proximal end on the rotatable shaft of the second direct drive motor;

(h) a third slide member pivotally mounted on a distal end of the third arm member;

(i) a second rail on which the third slide member is mounted for sliding movement therealong; and (j) a table having a reverse surface to which the first and second slide members and the second rail are fixedly secured in such a manner that the direction of movement of the first and second slide members along the first rail is perpendicular to the second rail.

When the first direct drive motor is rotated, the first rail is moved through the parallel crank mechanism to move the table in one direction, for example, in an X-direction along the second rail. When the second direct drive motor is rotated, the third arm member moves the table in the other direction, for example, in a Y-direction along the first rail.

DESCRIPTION OF THE PREFERRED EMBODIMENT

The invention will now be described with reference to the drawings.

Figure 1:
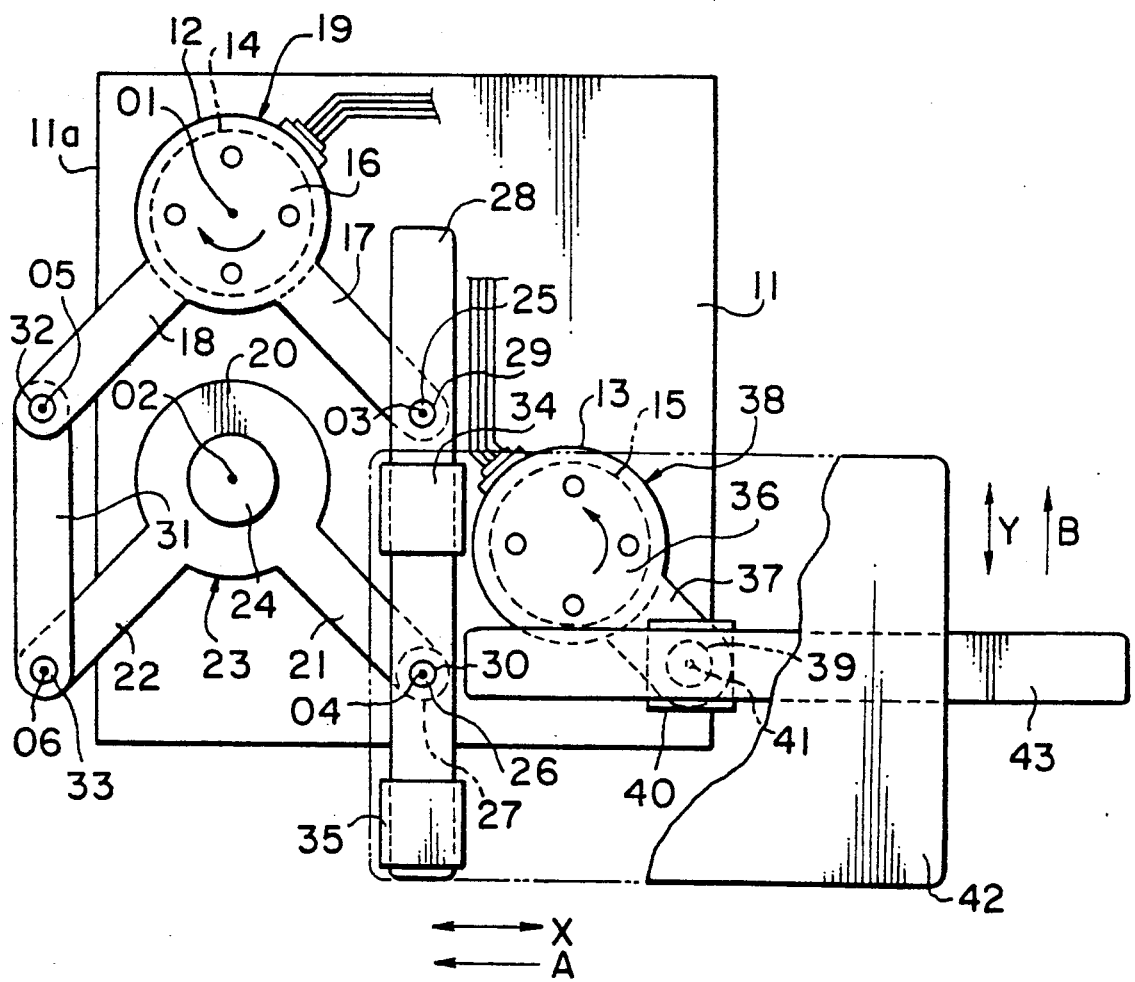
FIG. 1 is a schematic plan view of a positioning table provided in accordance with the present invention.
Figure 2:
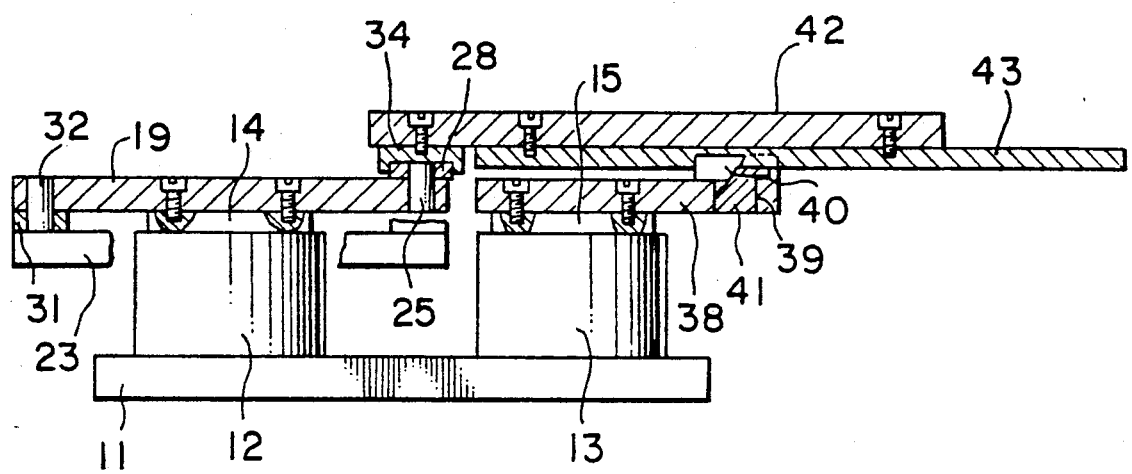
FIG. 2 is a cross-sectional view of the positioning table, as viewed from the front side.
Figure 3:
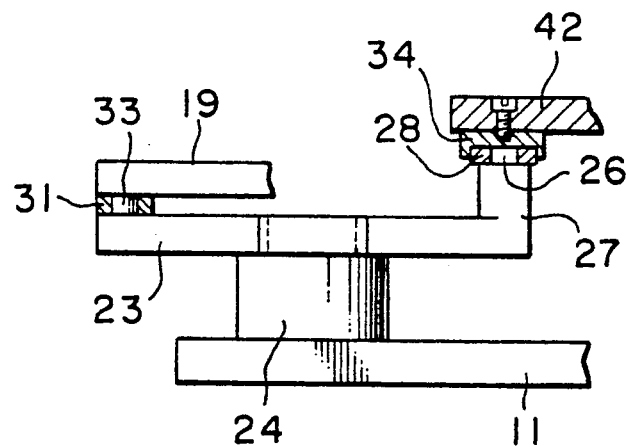
FIG. 3 is a cross-sectional view of a portion of the positioning table.

FIG. 1 shows a positioning table according to an embodiment of the present invention. This positioning table includes a base 11 of a generally square shape, and first and second direct drive motors 12 and 13 of an identical size fixedly mounted on an upper surface of the base 11 and disposed substantially on one diagonal line of the square base 11. Rotatable shafts 14 and 15 of the direct drive motors 12 and 13 are directed upwardly. A first arm member 19 has a disk-shaped proximal end portion 16, and two arms 17 and 18 extending radially from the proximal end portion 16 and spaced at an angle of substantially 90° from each other. The proximal end portion 16 of the first arm member 19 is fixedly mounted on the rotatable shaft 14 of the first direct drive motor 12. The first arm member 19 is disposed in parallel relation to the base 11. Like the first arm member 19, a second arm member 23 has a disk-shaped proximal end portion 20, and two arms 21 and 22 extending radially from the proximal end portion 20 and spaced at an angle of substantially 90° from each other. The proximal end portion 20 of the second arm member 23 is angularly movably mounted on a support shaft 24 fixedly mounted on the base 11 in perpendicular relation thereto. The second arm member 23 is disposed in parallel relation to the base 11. A straight line, passing through the center O1 of the proximal end portion 16 of the first arm member 19 and the center O2 of the proximal end portion 20 of the second arm member 23, is substantially parallel to one side 11a of the base 11. The height of the support shaft 24 is smaller than the height of the first direct drive motor 12. Upwardly-directed pins 25 and 26 are provided respectively on the distal end portion of the arm 17 of the first arm member 19 and the distal end portion of the arm 21 of the second arm member 23. The distance between the center O1 of angular movement of the proximal end portion 16 and the center (axis) O3 of the pin 25 is equal to the distance between the center O2 of angular movement of the proximal end portion 20 and the center (axis) O4 of the pin 26. The pin 26 is provided on an upper end of a boss 27 formed integrally on the distal end portion of the arm 21. The two pins 25 and 26 are angularly movably fitted respectively in two pin-receiving holes 29 and 30 formed in a first rail 28. The distance between the center O1 and the center O2 is equal to the distance between the center O3 and the center O4. The first and second arm members 19 and 23 cooperate with the first rail 28 to form a parallel crank mechanism. Opposite ends of an elongate connecting plate 31 are pivotally connected respectively to the distal end of the arm 18 of the first arm member 19 and the distal end of the arm 22 of the second arm member 23 by pins 32 and 33. The connecting plate 31 serves to reinforce the parallel crank mechanism. The distance between the center O1 and the center O5 of the pin 32 as well as the distance between the center O2 and the center O6 of the pin 33 is equal to the distance between the centers O1 and O3 as well as the distance between the centers O2 and O4. The distance between the centers O5 and O6 is equal to the distance between the centers O3 and O4.

First and second slide members 34 and 35 of a channel-shaped cross-section are slidably fitted on the first rail 28.

A third arm member 38 has a disk-shaped proximal end portion 36, and a short arm 37 extending radially from the proximal end portion 36. The proximal end portion 36 is fixedly mounted on the rotatable shaft 15 of the second direct drive motor 13. The third arm member 38 is disposed in parallel relation to the base 11. A pin-receiving hole 39 is formed in the distal end of the arm 37 of the third arm member 38, and a pin 41 formed on a lower surface of a third slide member 40 of a channel-shaped cross-section is angularly movably received in the pin-receiving hole 39. A second rail 43 is fixedly secured to a reverse or lower surface of a table 42, the second rail 43 extending in a direction perpendicular to the first rail 28. The third slide member 40 is fitted on the second rail 43 from the lower side thereof so as to slide therealong. The first and second slide members 34 and 35 are also fixedly secured to the reverse surface of the table 42.

Figure 4:
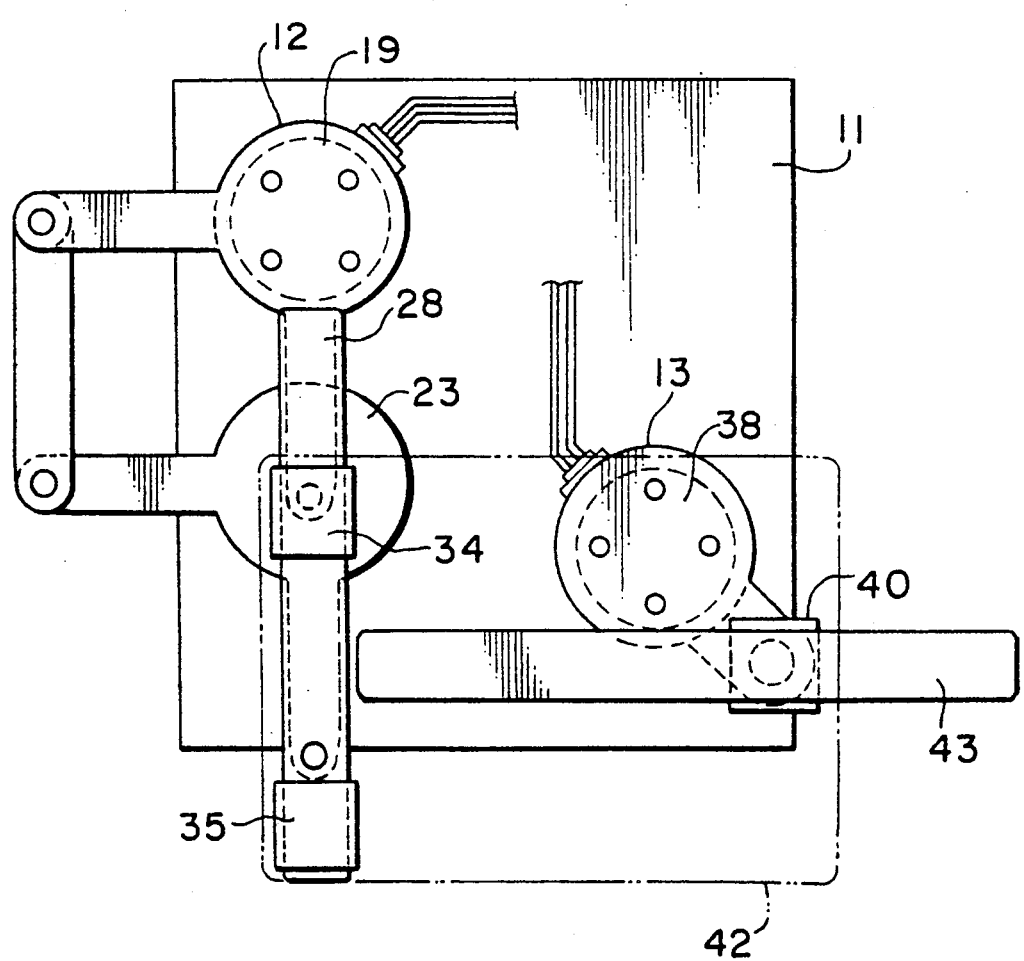
FIGS. 4 and 5 are plan views of the positioning table, showing different operative conditions of the positioning table, respectively.

The operation of the above positioning table will now be described. In the condition shown in FIG. 1, when the first direct drive motor 12 is rotated or angularly moved through an angle of 45° in a clockwise direction (FIG. 1), the parallel crank mechanism, comprising the first and second arm members 19 and 23 and the first rail 28, is angularly moved 45° in a clockwise direction to move the first rail 28 in a parallel manner so as to move the table 42 in a direction A (i.e., X-direction) through the first and second slide members 34 and 35. At this time, since the movement of the table 42 in a Y-direction is prevented by the third arm member 38 through the second rail 43 and the third slide member 40, the second rail 43 slides relative to the third slide member 40 in the direction A, and at the same time the first arm 28 slides relative to the first and second slide members 34 and 35. This condition is shown in FIG. 4. Namely, the table 42 is moved from the position of FIG. 1 only in the direction A.

Figure 5:
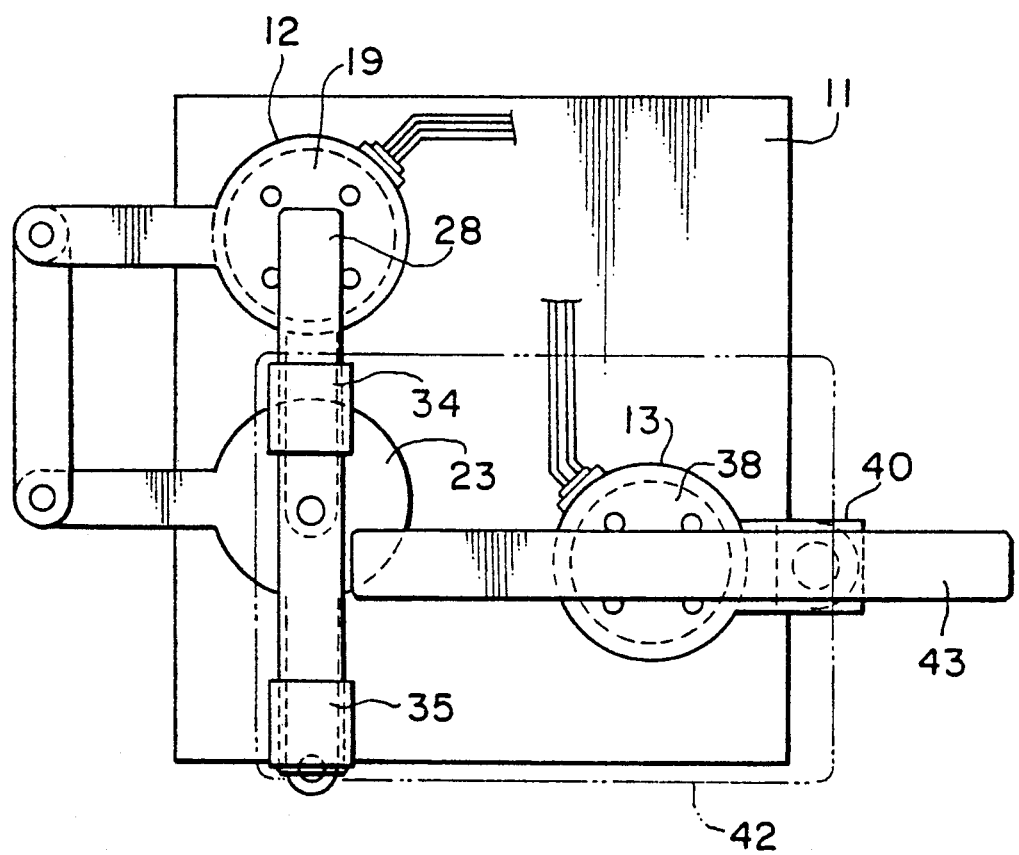
Figure 6:
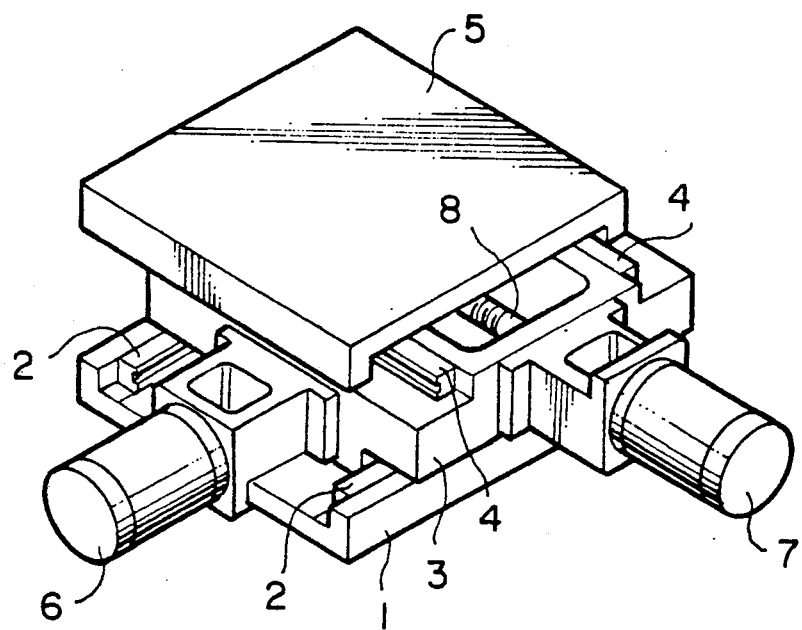
FIG. 6 is a schematic perspective view of a conventional positioning table.

In this condition, when the second direct drive motor 13 is rotated or angularly moved by 45° in a counterclockwise direction, the third arm 38 angularly moves the third slide member 40 through 45° in the same direction, so that the second rail 43 is moved in a direction B (i.e., Y-direction) through the third slide member 40. At this time, since the movement of the table 42 in the X-direction is prevented by the first and second slide members 34 and 35 engaging the first rail 28, the table 42 is moved only in the direction B. This condition is shown in FIG. 5.

In an actual machine or apparatus to which the above positioning table is applied, it is preferred that stepping motors of a high resolution be used as the first and second direct drive motors 12 and 13 so as to simultaneously effect the X-direction and Y-direction positionings instantaneously.

As described above, in the positioning table according to the present invention, the two direct drive motors are mounted on the common flat surface, and one of the two motors drives the parallel crank mechanism to move the table in one direction. The other direct drive motor drives the third arm member connected to the table through the second rail, so as to move the table in the other direction perpendicular to the one direction. Therefore, high positioning accuracies can be achieved, and a high-speed positioning control can be attained, and the machine or apparatus incorporating the positioning table can be made smaller in size.

What is claimed is:

1. A positioning table comprising:
   (a) a base;
   (b) first and second direct drive motors fixedly mounted on said base and having respective rotatable shafts directed upwardly;
   (c) a first arm member fixedly mounted at its proximal end on said rotatable shaft of said first direct drive motor;
   (d) a second arm member angularly movably mounted at its proximal end on said base;
   (e) a first rail to which distal ends of said first and second arm members are pivotally connected, said first rail cooperating with said first and second arm members to form a parallel crank mechanism;
   (f) first and second slide members mounted on said first rail for sliding movement therealong;
   (g) a third arm member fixedly mounted at its proximal end on said rotatable shaft of said second direct drive motor;
   (h) a third slide member pivotally mounted on a distal end of said third arm member;
   (i) a second rail on which said third slide member is mounted for sliding movement therealong; and
   (j) a table having a reverse surface to which said first and second slide members and said second rail are fixedly secured in such a manner that the direction of movement of said first and second slide members along said first rail is perpendicular to said second rail.

2. A positioning table according to claim 1, wherein each of said first and second arm members has a pair of arms extending in a common plate from said proximal end portion and spaced at a predetermined angle from each other, one of said two arms being pivotally connected at its distal end to said first rail, said parallel crank member further comprising an elongated connecting plate disposed parallel to said first rail, and the other of said two arms of each of said first and second arm members being pivotally connected at its distal end to said connecting plate.

3. A positioning table according to claim 1, wherein each of said first and second slide members has a channel-shaped cross-section and is slidably fitted on and said first rail, said third slide member has a channel-shaped cross-section and is slidably fitted on said second rail.

* * * * *